(12) United States Patent
Emelyanov et al.

(10) Patent No.: US 9,548,964 B1
(45) Date of Patent: *Jan. 17, 2017

(54) VPN FOR CONTAINERS AND VIRTUAL MACHINES IN LOCAL AREA NETWORKS

(71) Applicant: Parallels IP Holdings GmbH, Schaffhausen (CH)

(72) Inventors: Pavel Emelyanov, Moscow (RU); James Bottomley, Seattle, WA (US)

(73) Assignee: Parallels International GmbH, Schaffhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/333,379

(22) Filed: Oct. 25, 2016

Related U.S. Application Data

(62) Division of application No. 14/710,876, filed on May 13, 2015, now Pat. No. 9,485,219.

(51) Int. Cl.
*H04L 29/06* (2006.01)
*H04L 29/08* (2006.01)
*H04L 12/46* (2006.01)
*G06F 9/455* (2006.01)

(52) U.S. Cl.
CPC ....... *H04L 63/0272* (2013.01); *G06F 9/45558* (2013.01); *H04L 12/4641* (2013.01); *H04L 65/4076* (2013.01); *H04L 67/288* (2013.01); *H04L 67/2823* (2013.01); *G06F 2009/45587* (2013.01); *G06F 2009/45595* (2013.01); *H04L 63/0281* (2013.01)

(58) Field of Classification Search
CPC ................................................. H04L 63/0272
See application file for complete search history.

(56) References Cited

U.S. PATENT DOCUMENTS

| | | | | |
|---|---|---|---|---|
| 6,947,384 | B2* | 9/2005 | Bare | H04L 12/185 370/235 |
| 7,333,491 | B2* | 2/2008 | Chen | H04L 12/462 370/392 |
| 9,319,317 | B1* | 4/2016 | Spadaro | H04L 45/745 |
| 2011/0243142 | A1* | 10/2011 | Kwon | H04L 41/5041 370/400 |
| 2014/0044130 | A1* | 2/2014 | Banavalikar | H04L 49/351 370/392 |
| 2014/0122675 | A1* | 5/2014 | Cohen | H04L 12/413 709/223 |
| 2015/0003463 | A1* | 1/2015 | Li | H04L 45/507 370/395.53 |
| 2016/0127229 | A1* | 5/2016 | Wingrove | H04L 45/74 370/392 |

* cited by examiner

*Primary Examiner* — Izunna Okeke
*Assistant Examiner* — Ali Shayanfar
(74) *Attorney, Agent, or Firm* — Bardmesser Law Group

(57) ABSTRACT

A method, system and computer program product for a VPN for containers and VMs implemented on different network node. A number of network hardware nodes have containers and VMs running on them. The containers and VMs are aggregated into VPNs assembled across the hardware nodes. Each hardware node has a network edge programmable switch configured to route packets to containers and VMs only inside a particular VPN. The switch detects a number of the VPN inside the packet header, replaces this number by a standard broadcast header number and multi-casts the packet to the containers and the VMs inside the VPN.

12 Claims, 2 Drawing Sheets

VPN FOR CONTAINERS AND VIRTUAL MACHINES IN LOCAL AREA NETWORKS

CROSS REFERENCE TO RELATED APPLICATIONS

This application is a divisional of U.S. patent application Ser. No. 14/710,876, filed May 13, 2015, incorporated herein by reference in its entirety.

BACKGROUND OF THE INVENTION

Field of the Invention

The present invention is related to Virtual Private Networks (VPNs) and, in particular, to a method and system for an effective VPN creation of Virtual Environments (VMs and containers) in local area networks.

Description of the Related Art

A virtual private network (VPN) extends a private network across a public network, such as the Internet. The VPN enables a computer to send and receive data across shared or public networks as if it were directly connected to the private network, while benefiting from the functionality, security and management policies of the private network. The VPN is created by establishing a virtual point-to-point connection through the use of dedicated connections, virtual tunneling protocols, or traffic encryptions.

The VPN connection across the Internet is similar to a wide area network (WAN) link between sites. From a user's perspective, the extended network resources are accessed in the same way as resources available within the private network. The VPNs allow employees to securely access their company's intranet while traveling outside the office. Similarly, VPNs securely connect geographically separated offices of an organization, creating one cohesive network. The VPN technology is also used by Internet users to connect to proxy servers for the purpose of protecting personal identity and location.

A modern trend of virtualization presents some challenges with regard to creating a VPN. The virtualization technology provides for several Virtual Environments (VEs)—Virtual Machines (VMs) and/or Containers (such as from PARALLELS) implemented on each of the hardware node of a network. If a VPN needs to include VM and/or Containers implemented on different hardware nodes of a network, the connection to corresponding VM or Container should be set up directly and adding new Containers to the VPN can be established through complicated procedures. As an alternative, the broadcasting of VPN packets may be used instead, but it is not secure when packets are routed on the hardware level and such an insecure form of implementation may be rejected by users and system administrators.

Accordingly, a method and system for an efficient and secure VPN creation and reconfiguration for Containers and VMs in any combinations is desired.

SUMMARY OF THE INVENTION

The present invention is related to Virtual Private Networks (VPNs) and, in particular, to a method and system for a VPN creation for VEs (VMs and containers) that substantially overcomes the disadvantages of the related art.

According to an exemplary embodiment, a method, system and computer program product for creating a VPN of VEs (i.e., containers and VMs) implemented on different network nodes is provided. A number of network hardware nodes have containers and VMs running on them. The containers and VMs are logically aggregated into VPNs assembled across the hardware nodes. Each hardware node has a hardware network adapter and programmable switch configured to route packets from a hardware adapter to containers and VMs and vice versa only inside a particular VPN. The switch or router can determine which VPN the outgoing packet belongs to by checking from which (virtual) port the packet has arrived and processes the packet correspondingly.

If the incoming multicast packet corresponds to certain VPN subscribers, the switch replaces multicast identifier with a broadcast identifier and routes packet to VPN subscribers only. This defines limits on the distribution of the packets, since multi-cast packets may be received by subscribers only. Here broadcast packet is not distributed to all VEs of the hardware node on which the VEs run, but only to the VPN subscribers, if a VM/Container sends a broadcast packet, the switch replaces the broadcast destination identifier with the multicast identifier corresponding to the group ID/Number the sending VM/CT belongs to.

According to the exemplary embodiment, a broadcast protocol (e.g., ARP protocol) indicates from where broadcast packets appear from. Here, at the first stage a VPN identifier is broadcasted to all VEs of the hardware node, and then, only the VE nodes that have successfully requested the packet or packets can get the broadcast packets. If the multi-cast packet contains the MAC address of the destination VE, the VE requesting VPN packet with the certain MAC address receives the packet.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
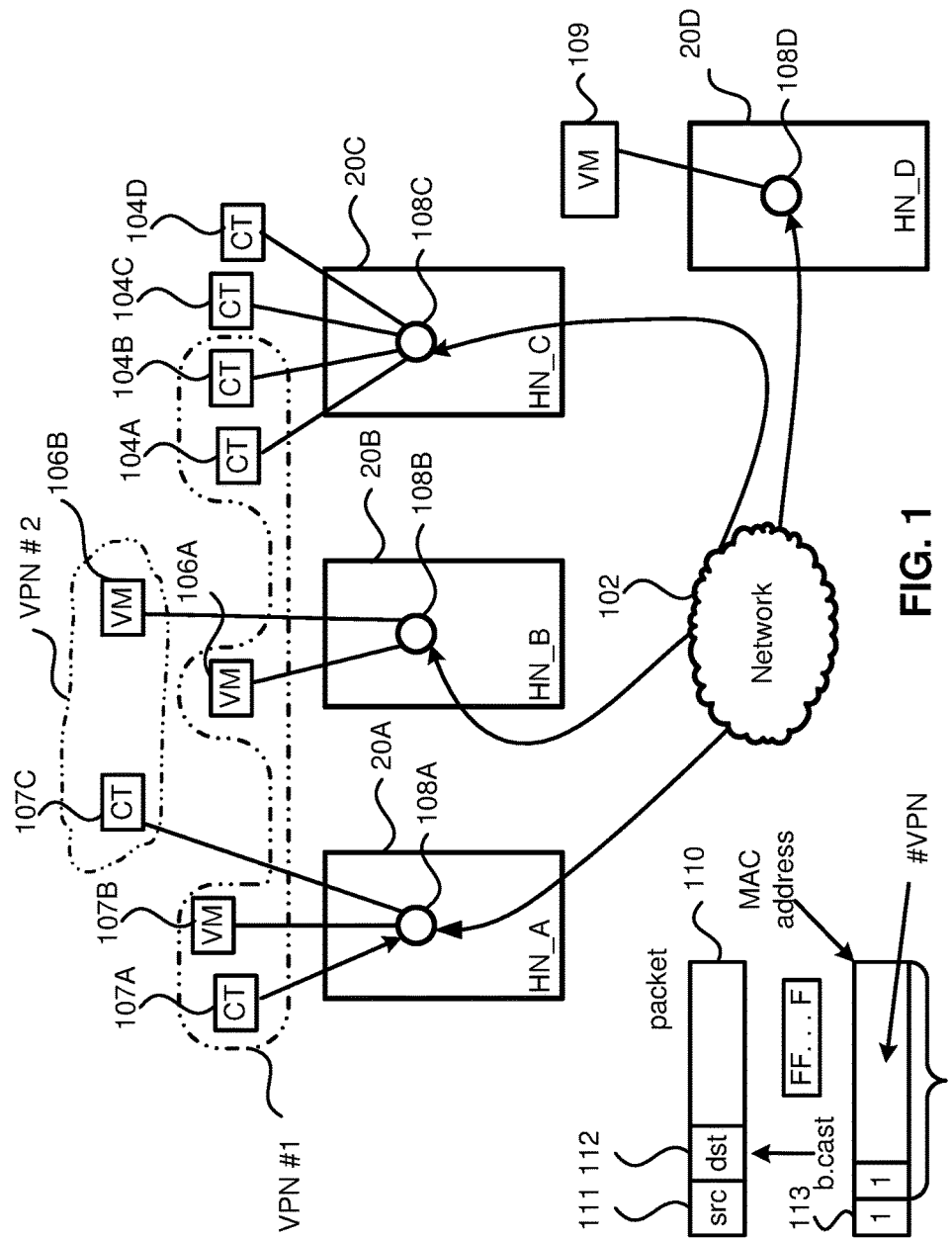
FIG. 1 illustrates a VPN architecture for VEs, in accordance with the exemplary embodiment.

Reference will now be made in detail to the preferred embodiments of the present invention, examples of which are illustrated in the accompanying drawings.

According to an exemplary embodiment, a method, system and computer program product for creating a VPN for VEs (i.e., containers and VMs) implemented on different network nodes is provided.

DEFINITIONS

Virtual Machine (VM)—a type of an isolated Virtual Environment running on the same physical machine simultaneously, such as, for example, available from Microsoft Corp., VMware, Inc. or Parallels Software International, Inc. Each Virtual Machine instance executes its own OS kernel, and virtualizes the processor. Support of the VMs is implemented using a Virtual Machine Monitor and/or a Hypervisor.

Container (CT)—is one type of a Virtual Environment running on the same hardware node with a shared OS kernel and most of the system resources, where isolation of the Container is implemented on the namespace level. A container acts as an isolated virtual server within a single machine, where multiple sets of application services are organized on a single hardware node by placing each into an isolated virtual container. The Container virtualizes the operating system through the kernel abstraction layer.

According to an exemplary embodiment, a method, system and computer program product for creating a VPN for containers and VMs implemented on different network nodes is provided. A number of network hardware nodes have containers and VMs running on them. Sometimes the containers and VMs need to be aggregated into VPNs assembled across the hardware nodes. Each hardware node has a software implemented programmable network switch configured to route packets to certain containers and VMs on that hardware node as if they were routed inside a real VPN.

According to the exemplary embodiment, there are hardware nodes (HNs) and a local network between them. There is a plurality of VMs and CTs hosted on the HNs. There is also a software switch running on each of the HNs that can forward packets between VMs/CTs over the local network. The following principles are applied:

1. It is desired to logically aggregate VMs and CTs into private networks (VPNs) by sending packets via the local network. "Private" means that any packet traveling between VMs/CTs from one VPN cannot be seen on virtual adapters of VMs and CTs belonging to another VPN (or not belonging to any VPNs).

2. For uni-cast packets this is achieved by programming the switch to forward packets to appropriate ports only.

3. For multi-cast packets a so called "MAC-rewrite" procedure is performed. On each outgoing multi-cast packet (traveling form the VM/CT to the switch and over the local net) the switch rewrites the destination MAC address to contain:
   a) multicast bit set;
   b) locally administered bit set; and
   c) the VPN identifier in the rest bits.

According to the exemplary embodiment, the VPN identifier is taken from virtual NIC from which the packet has arrived.

On each incoming packet (local net to switch to VM/CT), the switch checks for VPN identifier (found in the destination MAC address field) to match any virtual NICs attached to it and rewrites the destination MAC address back to be broadcast.

4. Multicasts from VMs/CTs are not supported, but can be implemented in a similar manner.

FIG. 1 illustrates VPN architecture for containers and VMs, in accordance with the exemplary embodiment. Hardware nodes 20A, 20B and 20C are connected by a network 102. The node 20A has containers 107A and 107C and VM 107B running on it. The node 20B has VMs 106A and 106B running on it and the node 20C has containers 104A-104D running on it. The node 20D has a VM 109 implemented on it. A VPN #1 includes containers 104A and 104B and 107A and VMs 107B and 106A. A VPN #2 includes a container 107C and a VM 106B. The containers and the VMs are connected to the network 102 via software switches that serve as a self-learning programmable module.

Since some of the VPN virtual nodes cannot be seen outside hardware nodes, initially, multicast packets are distributed among the entire LAN. Then the hardware nodes that stay silent as far as the VPN is concerned are excluded from recipients. Thus, all traffic coming out of the container 107A should be sent to the VM 107B, the VM 106A and the containers 104A and 104B in the broadcast mode, but the other containers and VMs should not see these packets.

According to the invention, programmable software switches 108A-108D are implemented on each hardware node. For example, a packet 110 comes from the container 107A. The packet has a source address 111 in the header and VPN identifier as a metadata accessible by parsing packet.

The ARP Proxy is aware of the location of the traffic's destination. The ARP Proxy offers its own MAC address in reply, effectively saying "send it to me, and I will get it to where it needs to go." Serving as an ARP Proxy for another host effectively directs LAN traffic to the Proxy. The "captured" traffic is, then, routed by the Proxy to the intended destination via another interface or via a tunnel. The process, which results in the node responding with its own MAC address to an ARP request for a different IP address for proxying purposes, is sometimes referred to as "publishing." Note that the ARP used as an example of broadcast protocol and any other broadcast protocol and the Proxy can be used.

Then, the packet is sent to a common network 102. Subsequently, the switches 108B, 108C and 108D receive the multicast packet 110 through the network 102 and analyze it. The switches check if the destination containers/VMs corresponding to the VPN# are running on the respective hardware node and then either drop the packets or redirect them as described above.

In case of the hardware node 20D, the packet will reach the node and will be discarded by the switch 108D, since there are no VPNs that include the VM 109. Note that the software implemented programmable intelligent switches are located after hardware LAN cards or network adapters.

Figure 2:
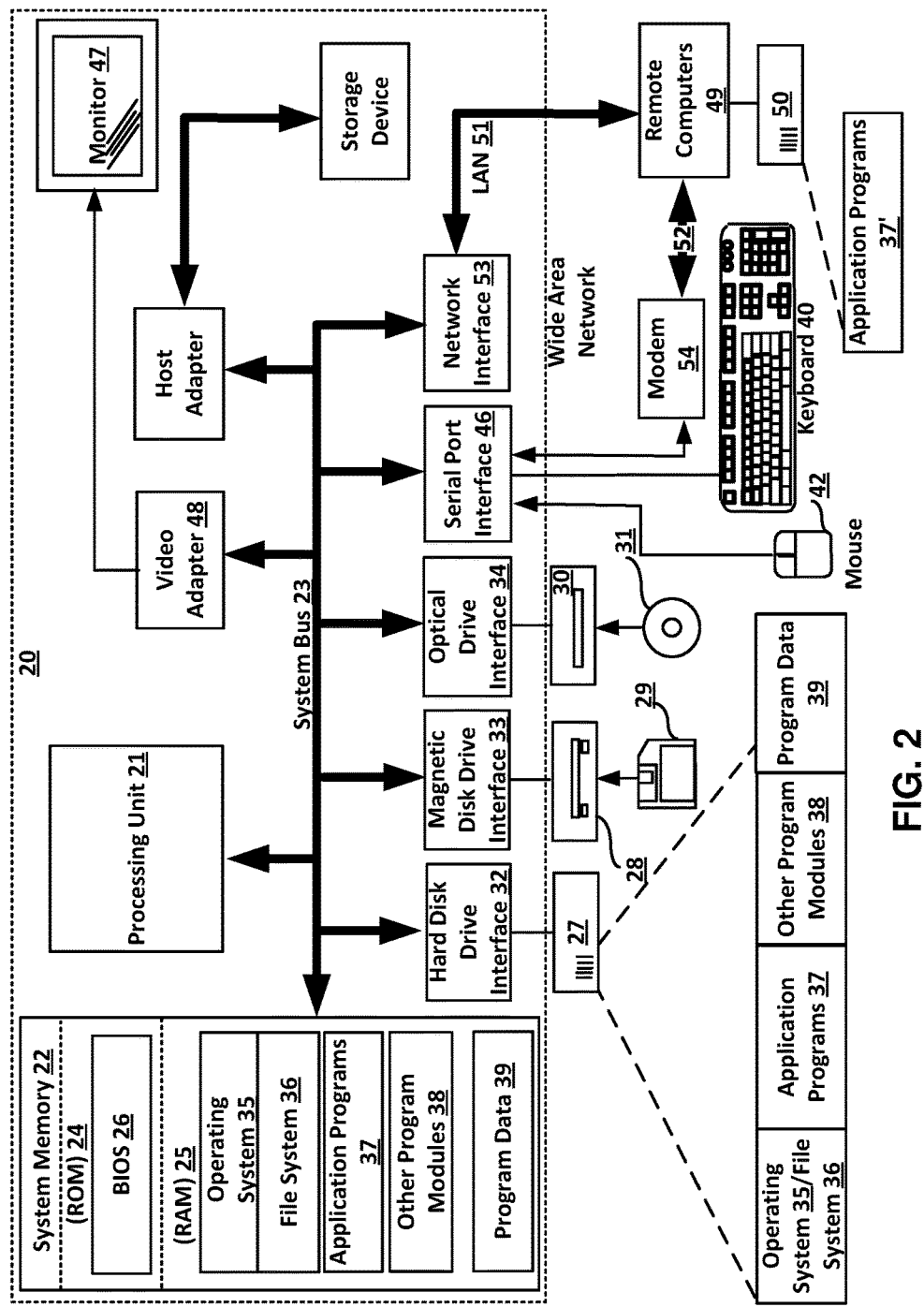
FIG. 2 illustrates a schematic of an exemplary computer system or a server that can be used for implementation of the invention.

With reference to FIG. 2, an exemplary system for implementing the invention includes a general purpose computing device in the form of a computer system/network node 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented method for combining Virtual Environments (VEs) into a Virtual Private Network (VPN), the method comprising:
   connecting at least two host nodes into an Ethernet network;
   launching at least two VEs on each of the hosts;
   combining the VEs from both hosts into a VPN;
   assigning a number to the VPN;
   configuring a software switch on each of the hosts to route packets to VEs that subscribe to the VPN;
   using a self-taught switch connected to the software switches of the hardware nodes to join different hardware nodes into a segment of the Ethernet network;
   analyzing an incoming broadcast packet by the software switch;
   replacing a standard MAC address in a packet header by a number of the VPN to which a source VE belongs;
   based on the MAC addresses of the packet, changing a destination address of the packet to the VPN number; and
   multi-casting the packet to VEs included into the VPN,
   wherein the hardware nodes receive VE-related traffic via an ARP proxy.

2. The method of claim 1, further comprising discarding the packet when it reaches a VE that is not associated with the VPN.

3. The method of claim 1, wherein the Virtual Environments of the VPN include both VMs and Containers on the same node.

4. The method of claim 1, wherein the VEs are Virtual Machines, each Virtual Machine having its own guest operating system kernel.

5. The method of claim 1, wherein the VEs are containers, wherein multiple containers share a host operating system of their hardware node.

6. The method of claim 1, wherein the VEs on the same node belong to different VPNs.

7. The method of claim 1, wherein the VPN comprises multiple VEs on each hardware node, and wherein at least one of the VEs on one node is a Virtual Machine and at least one of the VEs on the same node is a Container.

8. The method of claim 1, wherein multiple VEs on each hardware node subscribe to multiple different VPNs, and wherein each of the different VPNs includes at least one Virtual Machine and at least one Container.

9. The method of claim 1, wherein the VPN comprises multiple VEs on each hardware node, wherein the VEs on the same node belong to different VPNs.

10. The method of claim 1, wherein the VPN comprises multiple VEs on each hardware node, and wherein at least one of the VEs on one node is a Virtual Machine and at least one of the VEs on the same node is a Container.

11. The method of claim 1, wherein the programmable network switch is a self-taught switch configured to route subsequent packets only to the VEs subscribed to the VPN.

12. A computer program product comprising a non-transitory computer readable medium containing code for implementing the steps of:
   connecting at least two host nodes into an Ethernet network;
   launching at least two VEs on each of the hosts;
   combining the VEs from both hosts into a VPN;
   assigning a number to the VPN;
   configuring a software switch on each of the hosts to route packets to VEs that subscribe to the VPN;

using a self-taught switch connected to the software switches of the hardware nodes to join different hardware nodes into a segment of the Ethernet network;

analyzing an incoming broadcast packet by the software switch;

replacing a standard MAC address in a packet header by a number of the VPN to which a source VE belongs;

based on MAC addresses of the packet, changing a destination address of the packet to the VPN number; and multi-casting the packet to VEs included into the VPN, wherein the hardware nodes receive VE-related traffic via an ARP proxy.

\* \* \* \* \*